United States Patent [19]

Al-Saigh

[11] Patent Number: 4,642,223
[45] Date of Patent: Feb. 10, 1987

[54] METHOD FOR REMOVING SPENT CATALYST FROM A REACTOR TOWER AND ASSEMBLY FOR FACILITATING SAME

[75] Inventor: Abbas Al-Saigh, Fort McMurray, Canada

[73] Assignees: Alberta Energy Company Ltd.; Canadian Ocidental Petroleum Ltd.; Esso Resources Canada Limited, all of Calgary; Gulf Canada Limited, Toronto; Her Majesty the Queen in right of the Province of Alberta Canada, as represented by the Minister of Energy and Natural Resources, Edmonton; HBOG-Oil Sands Limited Partnership, Calgary; PanCanadian Petroleum Limited, Calgary; Petro-Canada Inc., Calgary, all of Canada

[21] Appl. No.: 719,208

[22] Filed: Apr. 2, 1985

[51] Int. Cl.$^4$ .............................................. B01J 8/04
[52] U.S. Cl. .................................. 422/191; 208/152; 208/154; 406/124; 414/216; 414/304; 414/416; 422/219; 422/310
[58] Field of Search ............... 422/148, 191, 192, 193, 422/194, 195, 213, 219, 310; 406/124, 125; 208/63–65, 152–156, 143–145; 261/94, 141; 414/216, 304, 416

[56] References Cited

U.S. PATENT DOCUMENTS

| | | |
|---|---|---|
| 2,369,478 | 2/1945 | Mekler et al. ........................ 422/191 |
| 3,235,344 | 2/1966 | Dreyer et al. ........................ 422/191 |
| 3,824,080 | 7/1974 | Smith et al. ......................... 422/191 |
| 4,229,418 | 10/1980 | Wijffels et al. ..................... 422/191 |
| 4,372,920 | 2/1983 | Zardi .................................. 422/148 |

Primary Examiner—Michael S. Marcus
Attorney, Agent, or Firm—Ernest Peter Johnson

[57] ABSTRACT

A basket is removably inserted in the upper end of each drain tube in those interbed assemblies of a catalytic tower whose catalyst beds are to be removed upwardly by vacuuming. The basket has a grid for a bottom wall, so that catalyst particles thereabove are retained but fluid being treated in the tower can easily pass therethrough. The provision of the baskets makes it possible to downwardly drain spent catalyst from the lower bed sections while simultaneously vacuuming it upwardly from the upper bed sections.

3 Claims, 4 Drawing Figures

METHOD FOR REMOVING SPENT CATALYST FROM A REACTOR TOWER AND ASSEMBLY FOR FACILITATING SAME

FIELD OF THE INVENTION

The present invention relates to a method and apparatus adapted to permit spent catalyst to be simultaneously vacuumed upwardly from the uppermost bed sections of a reactor tower and drained downwardly by gravity from the lowermost bed sections.

BACKGROUND OF THE INVENTION

The catalytic hydrogenation of hydrocarbon feedstock, such as untreated gas-oil, is conventionally conducted in a hydrotreater. Such a hydrotreater is commonly a vertically extending tower whose internal chamber is sub-divided into a plurality of bed sections by horizontally extending grid structures termed 'interbed assemblies'. Each bed section is packed with particulate catalyst, typically in the form of pellets that might have a length in the order of 15 mm and a diameter in the order of 3 mm.

An interbed assembly commonly comprises a steel rod grid underlain by a splash tray and a bubble cap tray. The assembly is designed to support a bed of catalyst whilst permitting the fluids in the reactor to pass therethrough.

Each interbed assembly commonly comprises a plurality of vertically disposed, open ended drain tubes which extend through the assembly. These tubes are normally filled with a column of steel balls whereby the catalyst beds are isolated one from another and yet fluids can easily pass from one section to another.

When the catalyst is spent, it must be removed from the tower to be either discarded or regenerated. This is commonly effected by a combination of two sequentially practised procedures. In accordance with the first procedure, the upper bed sections are first emptied, by inserting a vacuum hose through an aperture in the top of tower and sucking the catalyst upwardly out of the tower. If the second bed section is to be cleaned in the same way, the steel balls are removed from the drain tubes of the uppermost interbed assembly and the vacuum hose is extended through one of the drain tubes into the next section. Once the uppermost bed sections of the tower have been cleaned out in this way, an outlet is opened in the base of the tower. The remaining catalyst and the balls in the tubes then drain downwardly through the drain tubes and bed sections and are removed through the outlet from the tower.

Now, there is a reason why the uppermost bed or beds are recovered separately from lower beds. The catalyst at the top of the tower, where the hydrocarbon feed is usually introduced, normally is poisoned and exhausted at a faster rate than the catalyst lower down in the tower. Thus, at the end of a run, when the catalyst charge as a whole is no longer working at the desired level of efficiency, it is often desirable to recover the lowermost catalyst separately, as it may be regenerated and re-used, while the same procedure cannot be practiced with success on the uppermost catalyst.

Since the uppermost catalyst would drain with the lowermost catalyst if both were in the tower and the bottom outlet was opened and removal of catalyst therethrough began, it has heretofore been the practise, as far as I know, to first vacuum out the upper beds to be discarded, before beginning to drain the bottom beds.

This sequential technique is time-consuming. By way of example, in a 3-bed, 88 foot tall hydrotreater, having the first interbed assembly 12 feet from the top, the next 39 feet from the first, and the third 36 feet from the second, it required a total of 10 shifts to empty the tower using the sequential system. Of this total, two 12-hour shifts were required to vacuum out the upper bed section and eight 12-hour shifts were required to drain out the two lower bed sections. When both of the upper beds were to be vacuumed and qnly the bottom bed was to be drained, it took nine 12-hour shifts to complete vacuuming and four 12-hour shifts to drain.

SUMMARY OF THE INVENTION

In accordance with the invention, porous removable baskets are seated in the upper ends of each of the drain tubes of those interbed assemblies whose supported catalyst beds are to be vacuumed and delivered upwardly out of the tower. The baskets are each adapted to retain the column of catalyst thereabove, to prevent the latter from draining downwardly into the next bed section; however, they are capable of permitting the reactant fluids moving in the reactor to pass therethrough.

As a result of this change, it is now possible to simultaneously vacuum and drain the bed sections. By way of comparison, it took eight 12-hour shifts to simultaneously vacuum the top bed section and drain the two bottom bed sections of the hydrotreater previously described. It took nine 12-hour shifts to simultaneoqsly vacuum the two top bed sections and drain the bottom bed section. In the first case, there was a reduction of two 12-hour shifts; in the second case, the reduction was four 12-hour shifts. Over the course of a year of operation, this translates into significant increases in plant output.

Broadly stated, the invention is, in combination, a catalytic reactor tower having a plurality of interbed assemblies which extend generally horizontally across the tower chamber at vertically spaced apart levels and which sub-divide the chamber into a plurality of catalyst bed sections, one or more of which sections is to be emptied of spent catalyst at the end of a run by vacuuming said catalyst and delivering it upwardly out of the tower, said interbed assemblies each providing a grid for supporting a bed of particulate catalyst thereon, each such interbed assembly having at least one generally vertical drain tube extending therethrough to enable spent catalyst to be drained by gravity from one section to the next lower section, for removal from the base of the tower; and a plurality of removable baskets, positioned in the upper ends of the drain tubes associated with those interbed assemblies whose supported beds of catalyst are to be removed by vacuuming, each said basket having an apertured wall, said basket being operative to retain the column of catalyst thereabove, to prevent it from draining downwardly into the next lower bed section while permitting fluid to flow freely therethrough, whereby the bed sections to be vacuumed may be vacuumed at the same time as the bed sections to be drained are drained.

Another broad aspect of the invention is a method of operating a catalytic reactor tower having a plurality of interbed assemblies extending horizontally across the tower chamber to sub-divide it into catalyst bed sections, said interbed assemblies each providing a grid for supporting a bed of particulate catalyst thereon, each such interbed assembly having at least one generally vertical drain tube extending therethrough for enabling spent catalyst to be drained by gravity from one section to the next lower section. The improvement comprises: placing removable means, before loading the tower with catalyst for a run, in the upper end of each drain tube associated with each interbed assembly whose supported bed of catalyst is to be removed upwardly by vacuuming when spent, said means being operative to retain thereabove a column of particulate catalyst while permitting fluid to flow freely therethrough; vacuuming spent catalyst upwardly from the uppermost bed section at the end of the run; simultaneously downwardly draining spent catalyst from those bed sections beneath the one or more interbed assemblies fitted with said retaining means; and if required, removing the retaining means from the uppermost interbed assembly and then vacuuming spent catalyst from the next lower bed section and repeating this procedure until the tower is emptied.

DESCRIPTION OF THE PREFERRED EMBODIMENT

Figure 1:
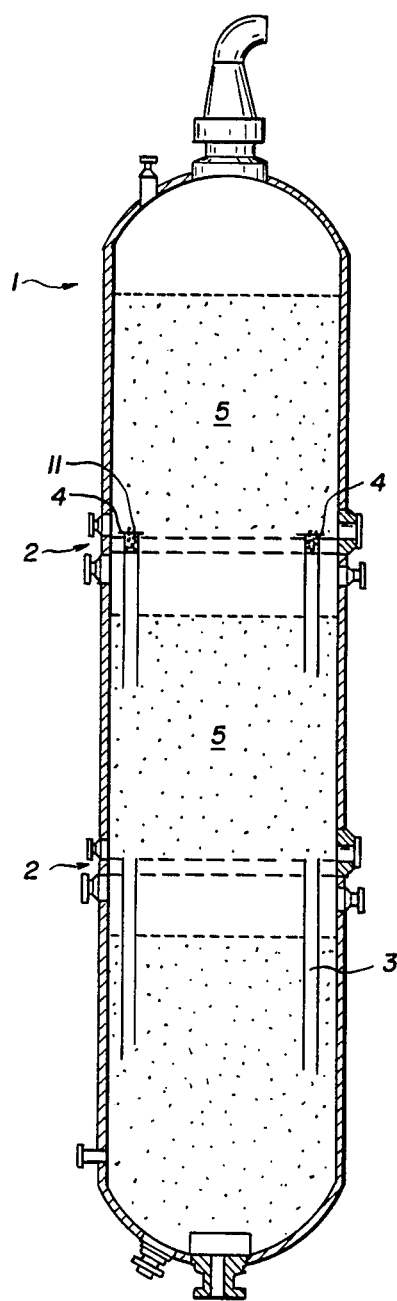
FIG. 1 is a schematic sectional side view showing a catalytic reactor tower with 2 interbed assemblies, the top assembly having baskets in its drain tubes.
Figure 2:
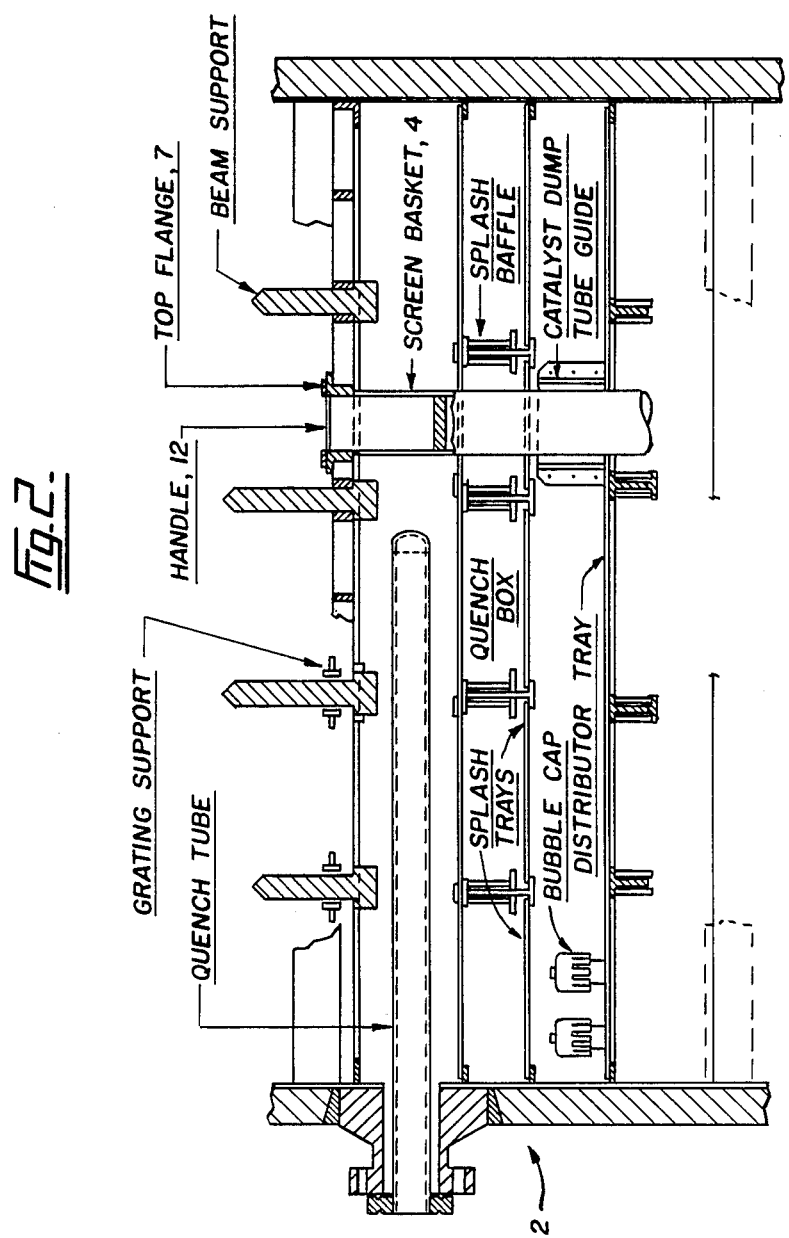
FIG. 2 is a sectional side view showing an interbed assembly in greater detail than FIG. 1, with baskets in place in the drain tubes.
Figure 3:
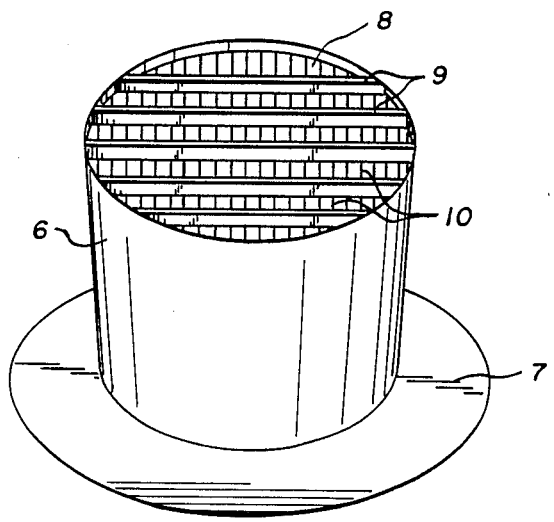
FIG. 3 is a perspective view showing a basket upside down, to illustrate the grid-like bottom wall.
Figure 4:
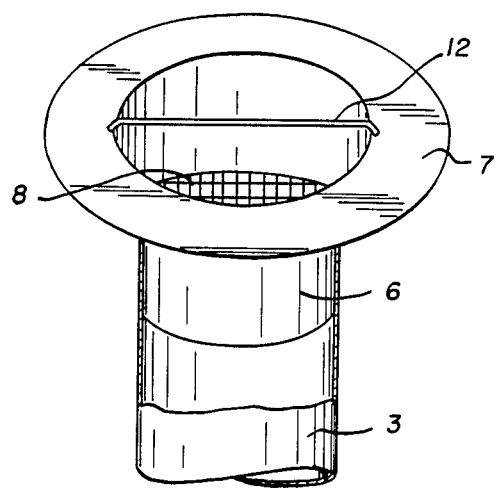
FIG. 4 is a perspective view showing the basket of FIG. 3 as it would be seated in the drain tube.

As stated, the invention in one aspect comprises the combination of a conventional hydrotreater or reactor tower 1, having a plurality of interbed assemblies 2 equipped with drain tubes 3, and removable baskets 4 seated in the upper ends of the drain tubes 3 and those interbed assemblies 2 whose particulate catalyst beds 5 are to be removed upwardly by vacuuming.

Each basket 4 is generally in the configuration of an inverted hat. It has a cylindrical vertical sidewall 6 and an outwardly extending , horizontal flange 7 at the upper end of said sidewall. A bottom wall 8 extends transversely across the bottom end of the sidewall 6. The bottom wall 8 is in the form of a grid, formed by spaced apart members 9 and 10. The grid openings are so sized that the catalyst is retained by the grid while fluid movement is readily permitted therethrough. The sidewall 6 is adapted to fit snugly within the drain tube 3; and the flange 7 is adapted to seat on the interbed assembly 2, to maintain the basket 4 in position in the upper end of its associated drain tube 3. The basket 4 is equipped with a handle 12, for easy removal from the drain tube.

The flanged, cylindrical design of the basket 4 allows it to be easily inserted into and removed from the drain tube 3. It can be lifted by the handle 12.

Each basket 4 is filled with inert steel balls 11, to further ensure that the catalyst particles cannot sift through or clog the basket grid.

In another aspect of the invention, a method is made available in that the baskets 4 can be placed, before the hydrotreater 1 is loaded with catalyst, in the drain tubes 3 of those interbed assemblies 2 whose catalyst beds 5 are to be removed upwardly by vacuuming. The hydrotreater 1 is then packed with catalyst and a production run proceeded with in conventional fashion. When the run is ended and the catalyst is to be removed, this is done by:

(1) vacuuming spent catalyst upwardly from the uppermost bed;
(2) simultaneously downwardly draining spent catalyst from the beds beneath the one or more interbed assemblies 2 fitted with said baskets 4; and
(3) if more than one bed is to be vacuumed, removing the baskets 4 from one or more of the drain tubes 3 of the uppermost interbed assembly and then vacuuming spent catalyst from the next lower bed while continuing to drain catalyst from the lower end of the tower if this is appropriate.

The scope of the invention is defined by the claims, which now follow.

The embodiments of the invention in which an exclusive property or privilege is claimed are defined as follows:

1. In combination:
   a catalytic reactor tower defining a chamber and having a plurality of interbed assemblies which extend generally horizontally across the tower chamber at vertically spaced apart levels and which sub-divide the chamber into a plurality of catalyst bed sections, one or more of which sections is to be emptied of spent catalyst at the end of a run by vacuuming said catalyst and delivering it upwardly out of the tower, said interbed assemblies each providing a grid for supporting a bed of particulate catalyst thereon, each such interbed assembly having at least one generally vertical drain tube extending therethrough to enable spent catalyst to be drained by gravity from one section to the next lower section, for removal from the base of the tower; and
   a plurality of removable catalyst baskets, at least one of said interbed assemblies having at least one drain tube having therein one of said plurality of catalyst baskets, each said bsket having an apertured wall, said basket being operative to retain the column of catalyst thereabove, to prevent it from draining downwardly into the next lower bed section while permitting fluid to flow freely therethrough, whereby the bed sections to be vacuumed may be vacuumed at the same time as the bed sections to be drained by gravity are drained.

2. The combination as set forth in claim 1 wherein each basket comprises:
   outwardly extending flange means at its upper end, for seating on the associated interbed assembly to maintain the basket in its position at the inlet of its associated drain tube;
   a downwardly extending sidewall adapted to fit snugly in one of said plurality of drain tubes;
   and a transversely extending bottom wall apertured as aforesaid.

3. In the method of operating a catalytic reactor tower having a plurality of vertically spaced interbed assemblies, including an uppermost interbed assembly, extending horizontally across the tower chamber to sub-divide it into catalyst bed sections including an uppermost bed section, said interbed assemblies each providing a grid for supporting a bed of particulate catalyst thereon, each such interbed assembly having at least one generally vertical drian tube extending therethrough for enabling spent catalyst to be drained by gravity from one section to the next lower section, the improvement comprising:

placing removable means, before loading the tower with catalyst for a run, in the upper end of each drain tube associated with the uppermost interbed assembly, said means being operative to retain thereabove a column of particulate catalyst while permitting fluid to flow freely therethrough;

vacuuming spent catalyst upwardly from the uppermost bed section at the end of the run; and simultaneously downwardly draining spent catalyst from those bed sections beneath the one or more interbed assemblies fitted with said retaining means.

* * * * *